(12) United States Patent
Dejaune et al.

(10) Patent No.: US 8,087,879 B2
(45) Date of Patent: Jan. 3, 2012

(54) DEVICE FOR COOLING THE SLOTS OF A ROTOR DISK IN A TURBOMACHINE HAVING TWO AIR FEEDS

(75) Inventors: Claude Gerard Rene Dejaune, Boissise la Bertrand (FR); Valerie Annie Gros, Grisy Suisnes (FR); Gael Loro, Combs la Ville (FR); Jean-Luc Soupizon, Vauz le Penil (FR)

(73) Assignee: SNECMA, Paris (FR)

( * ) Notice: Subject to any disclaimer, the term of this patent is extended or adjusted under 35 U.S.C. 154(b) by 833 days.

(21) Appl. No.: 12/143,284

(22) Filed: Jun. 20, 2008

(65) Prior Publication Data

US 2009/0004023 A1    Jan. 1, 2009

(30) Foreign Application Priority Data

Jun. 27, 2007  (FR) ...................... 07 56066

(51) Int. Cl.
*F01D 5/08* (2006.01)
(52) U.S. Cl. ........................ 415/115; 415/175
(58) Field of Classification Search ................ 415/115, 415/175
See application file for complete search history.

(56) References Cited

U.S. PATENT DOCUMENTS

| | | | |
|---|---|---|---|
| 5,232,339 A | 8/1993 | Plemmons et al. | |
| 5,402,636 A * | 4/1995 | Mize et al. | 60/806 |
| 5,478,207 A | 12/1995 | Stec | |
| 5,700,130 A * | 12/1997 | Barbot et al. | 416/95 |
| 7,556,474 B2 * | 7/2009 | Marchi | 415/115 |

FOREIGN PATENT DOCUMENTS

| | | |
|---|---|---|
| EP | 0 463 955 A1 | 1/1992 |
| EP | 1 264 964 A1 | 12/2002 |
| EP | 1 571 294 A1 | 9/2005 |
| FR | 2 164 197 | 7/1973 |

OTHER PUBLICATIONS

U.S. Appl. No. 12/145,820, filed Jun. 25, 2008, Dejaune, et al.

* cited by examiner

Primary Examiner — George Fourson, III
(74) Attorney, Agent, or Firm — Oblon, Spivak, McClelland, Maier & Neustadt, L.L.P.

(57) ABSTRACT

The invention relates to a device for cooling slots in a turbomachine rotor disk, comprising a rotor disk having a plurality of slots and a flange. The device also comprises blades, each having its root mounted in a respective slot, a retaining annulus having one end mounted against the upstream radial face of the disk, and a flange disposed around the flange of the disk and co-operating therewith to define a space forming a cooling air diffusion cavity that opens out into the bottom of each of the slots, together with air admission orifices opening out into the diffusion cavity at the upstream end thereof, the end of the retaining annulus that is mounted against the upstream radial face of the disk including a plurality of openings that open out radially into the bottom of each of the slots in the disk, at the upstream ends thereof.

3 Claims, 3 Drawing Sheets

DEVICE FOR COOLING THE SLOTS OF A ROTOR DISK IN A TURBOMACHINE HAVING TWO AIR FEEDS

BACKGROUND OF THE INVENTION

The present invention relates to the general field of turbomachine rotor disks that are provided at their peripheries with slots in which blade roots are mounted. The invention relates more particularly to a device enabling such slots to be cooled effectively.

In known manner, the disks of a turbomachine rotor, such as the disks in the various stages of the low pressure turbine, include at their periphery a plurality of substantially axial slots into which the roots of moving blades of the turbine are engaged.

While the turbomachine is in operation, the flow section of the low pressure turbine in which the blades are disposed passes gas at a temperature that is very high. The slots in the disk that receive the blade roots are therefore directly exposed to the hot gas so it is necessary to cool them in order to avoid any damage to the disks.

For this purpose, it is known to take a fraction of the air that flows outside the flow section of the low pressure turbine and direct it via a cooling circuit to the slots in the rotor disks. In practice, each rotor disk has an annular flange that extends upstream from the upstream radial face of the disk and around which there is mounted a retaining annulus. The disk flange and the retaining annulus are disposed in such a manner as to form between them an annular space forming a cooling air diffusion cavity. This diffusion cavity is fed with cooling air at its upstream end via a plurality of orifices that are regularly distributed around the axis of rotation of the disk, and at its downstream end it opens out into the bottom of each of the slots in the disk. Air that flows outside the flow section of the turbine penetrates into the diffusion cavity of the cooling circuit via orifices, diffuses in said cavity, and then ventilates the slots in the disk in order to cool them.

Nevertheless, that type of cooling circuit does not enable completely uniform cooling to be obtained for all of the slots in the rotor disk, which is harmful for good operation of the disk, and thus for the lifetime of the disk. It will readily be understood that with such a configuration, the slots that are disposed directly in line with the air speed orifices of the cooling circuit are cooled considerably better than the slots that are angularly offset further away therefrom.

OBJECT AND SUMMARY OF THE INVENTION

The present invention seeks to remedy the above-mentioned drawbacks by proposing a device that makes it possible to improve the cooling of slots in the rotor disk so as to increase its lifetime.

This object is achieved by a device for cooling the slots in a turbomachine rotor disk, the device comprising:
- a rotor disk comprising:
  - at its periphery, a plurality of substantially axial slots that are regularly distributed around the axis of rotation of the disk; and
  - an annular flange extending upstream from an upstream radial face of the disk;
- a plurality of blades each having a root mounted in a corresponding slot in the rotor disk;
- a retaining annulus having an end that is mounted against the upstream radial face of the disk and an annular flange that extends upstream from said upstream radial face of the disk and that is placed around the flange of the disk, while co-operating therewith to leave an annular space forming a cooling air diffusion cavity, this diffusion cavity opening out at its downstream end into the bottom of each of the disk slots, at the upstream ends thereof; and
- a plurality of air admission orifices regularly distributed around the axis of rotation of the disk and opening out into the diffusion cavity at the upstream end thereof;
wherein the end of the retaining annulus that is mounted against the upstream radial face of the disk includes a plurality of openings distributed around the axis of rotation of the disk and opening out axially into the bottom of each of the slots in the disk, at the upstream ends thereof.

The slot in the disk are thus fed with air coming both from the air admission orifices opening out into the upstream end of the diffusion cavity, and from admission openings opening out directly into the bottoms of the slots. This dual feed of the slots in the disk makes it possible to obtain cooling that is completely uniform for all of the slots in the disk, thereby contributing to increasing the lifetime of the disk.

In an advantageous disposition, the end of the retaining annulus that is mounted against the upstream radial face of the disk further includes a plurality of teeth extending radially outwards, each of which is designed to co-operate axially with a corresponding tooth of a blade root. The presence of these teeth makes it possible to retain the blades axially. In addition, air also feeds the slots in the disk via their upstream ends by passing between two adjacent teeth. The cooling of the slots in the disk is thus reinforced.

The invention also provides a turbomachine including at least one device for cooling the slots of a rotor disk, and as defined above.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
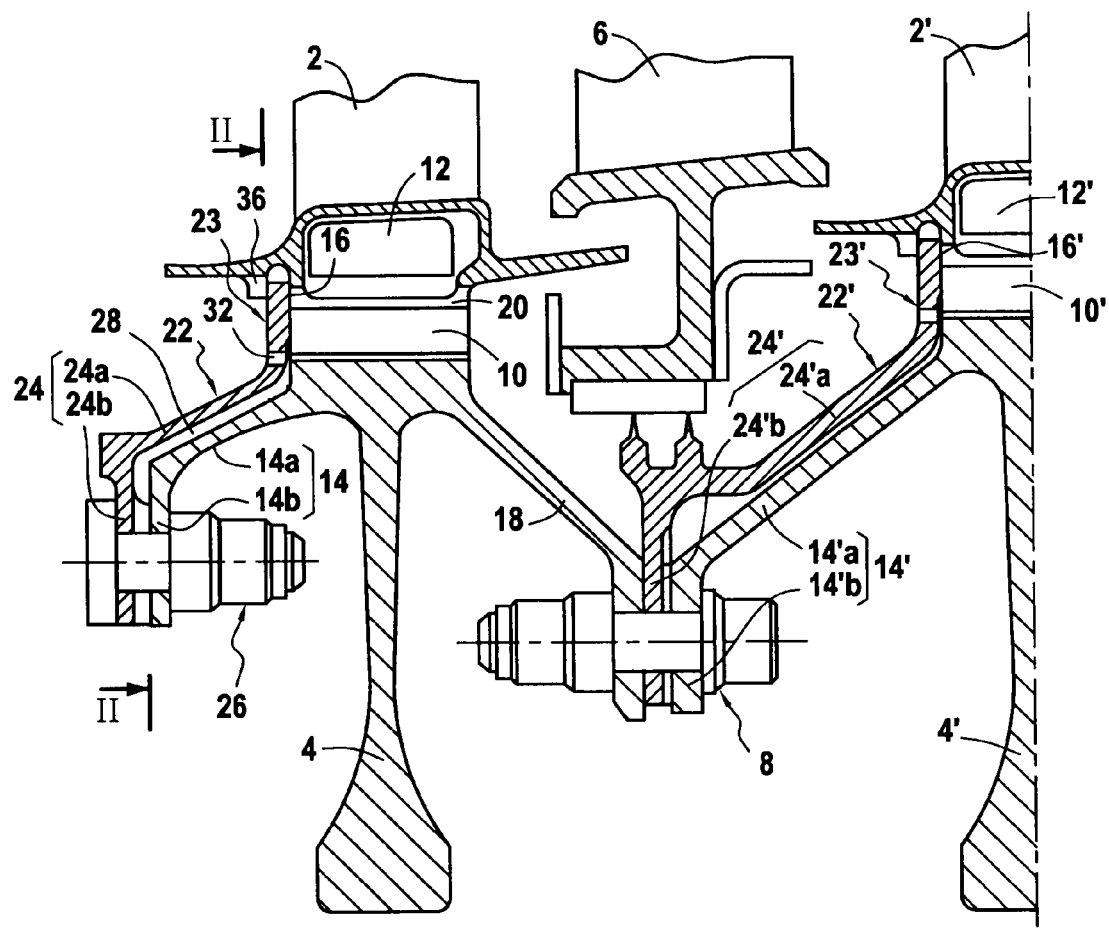
FIG. 1 is a fragmentary longitudinal section view of a low pressure turbine of a turbomachine that is fitted with a device constituting an embodiment of the invention.

FIG. 1 is a fragmentary longitudinal section view of a low pressure turbine of an aviation turbomachine fitted with a device constituting an embodiment of the invention.

Naturally, the present invention applies to any other turbomachine unit (aviation or terrestrial) that has a rotor disk with slots in which blade roots are mounted axially.

FIG. 1 shows more precisely the first stage and the second stage of the low pressure turbine. The first stage comprises a rotor wheel made up of a plurality of rotor blades 2 mounted axially on a rotor disk 4. The second stage comprises a nozzle made up of a plurality of stator vanes 6 and a rotor wheel placed behind the nozzle and formed by a plurality of rotor blades 2' mounted axially on a rotor disk 4'.

The rotor disks 4 and 4' of the first and second turbine states are centered on the longitudinal axis X-X of the turbomachine and are fixed to each other by bolted connections 8 that are regularly distributed around the axis X-X.

Each disk 4, 4' includes in its periphery a plurality of substantially axial slots 10, 10' that are open towards the outside of the disk and that are regularly distributed around the axis of rotation of the disks (this axis of rotation coincides with the longitudinal axis X-X of the turbomachine). Each slot is for axially receiving a respective root 12, 12' (e.g. fir-tree shaped) of a rotor blade 2, 2' (e.g. by interfitting).

Each disk 4, 4' also includes an annular flange 14, 14, that extends axially upstream from the radially upstream face 16, 16' of the disk. The flange 14, 14' is made up of a substantially axial annular portion 14a, 14'a that is extended by a substantially radial annular portion 14b, 14'b (referred to below as the upstream end of the disk flange).

The disk 4 of the first stage of the turbine also has an annular flange 18 extending axially downstream from the downstream radial face 20 of the disk. This flange 18 is used for fastening the disk 4 to the disk 4' of the second stage via bolted connections 8, as mentioned above.

A retaining annulus 22, 22' is mounted against the radially upstream face 16, 16' of each disk 4, 41. More precisely, each retaining annulus 22, 22' comprises an upstream end 23, 23' that is substantially radial and that is mounted against the upstream radial face 16, 16' of the disk, and an annular flange 24, 24' that extends axially upstream and that is disposed around the corresponding flange 14, 14' of the disk.

In addition, the flange 24, 24' of the retaining annulus is made up of an annular portion 24a, 24'a that is substantially axial, extended downstream by the end 23, 23' and upstream by an annular portion 24c, 24'c that is substantially radial (referred to below as the upstream end of the flange of the annulus).

The retaining annulus 22 of the first stage of the turbine is fastened to the flange 14 of the disk 4 via bolted connections 26 clamping together their respective upstream ends 24b, 14b. The retaining annulus 22' of the second stage is fastened to the flange 14' of the disk 4' by means of the bolted connections 8 for fastening together the disks 4, 4'.

For reasons of convenience, the description relates solely to the circuit for cooling the slots 10 in the disk 4 of the first stage of the turbine. Naturally, the circuit for cooling the slots 10' in the disk 4' of the second stage of the turbine is entirely analogous to the circuit of the first stage.

The flange 24 of the retaining annulus 22 is placed around the flange 14 of the disk in such a manner as to co-operate therewith to form an annular space 28 forming a cooling air diffusion cavity. This diffusion cavity 28 is essentially formed between the axial portions 24a, 14a of the respective flanges 24, 14 of the retaining annulus and of the disk.

The diffusion cavity 28 has its downstream end opening out into the bottom of each of the slots 10 in the disk 4, at the upstream ends of the slots. At its upstream end, the diffusion cavity is closed by tightening together the bolted connections 26 between the upstream ends 24b, 14b of the respective flanges 24, 14 of the retaining annulus and of the disk.

Furthermore, the diffusion cavity 28 is fed with a plurality of air admission orifices 30 that are regularly distributed around the longitudinal axis X-X and that open out into the upstream end of the diffusion cavity.

Figure 2:
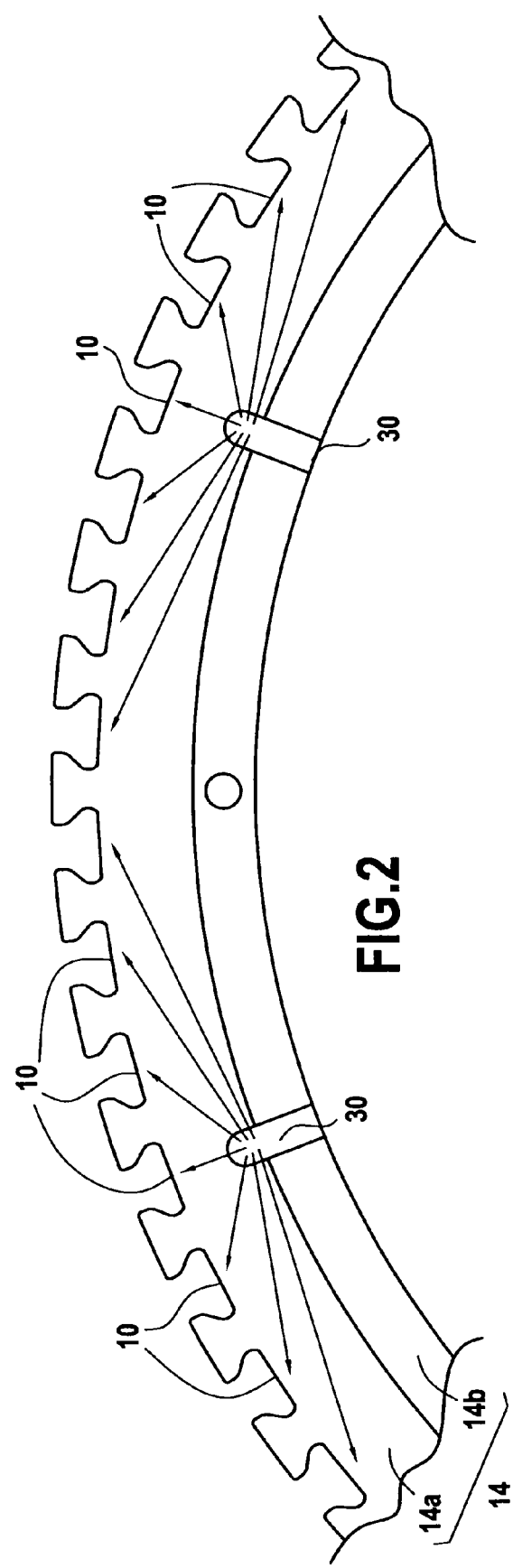
FIG. 2 is a section view on II-II of FIG. 1.

In the embodiment shown in FIG. 2, these air admission orifices 30 are formed by machining the upstream end 14b of the flange 14 of the disk 4 in a substantially radial direction. Naturally, these orifices could equally well be obtained by machining the upstream end 24b of the flange 24 of the retaining annulus 22.

Furthermore, the number of air admission orifices 30 over the disk as a whole can be varied. Thus, in the example of FIG. 2, the angular spacing between two adjacent air admission orifices 30 corresponds to about eight slots in the disk. Thus, each orifice 30 supplies cooling air for about seven slots.

According to the invention, the downstream end 23 of the retaining annulus 22 that is mounted against the upstream radial face 16 of the disk 4 comprises a plurality of holes 32 (or openings) distributed around the axis of rotation of the disk and opening out axially into the bottom of each of the slots 10 of the disk, at the upstream ends thereof.

More precisely, the downstream end 23 of the retaining annulus 22 has as many openings 32 as there are slots 10 in the periphery of the disk. These openings are in axial alignment with the bottoms of the slots.

Thus, each slot 10 in the disk is fed with cooling air by two different sources: firstly by the air coming from the diffusion cavity 28, and secondly by the air entering via the openings 32 formed in the downstream end 23 of the retaining annulus. The cooling of the slots in the disk can thus be made uniform over the entire disk.

According to an advantageous characteristic of the invention, the downstream end 23 of the retaining annulus 22 that is mounted against the upstream radial face 16 of the disk further comprises a plurality of teeth 34 (or crennelations) that extend radially outwards.

Figure 3A:
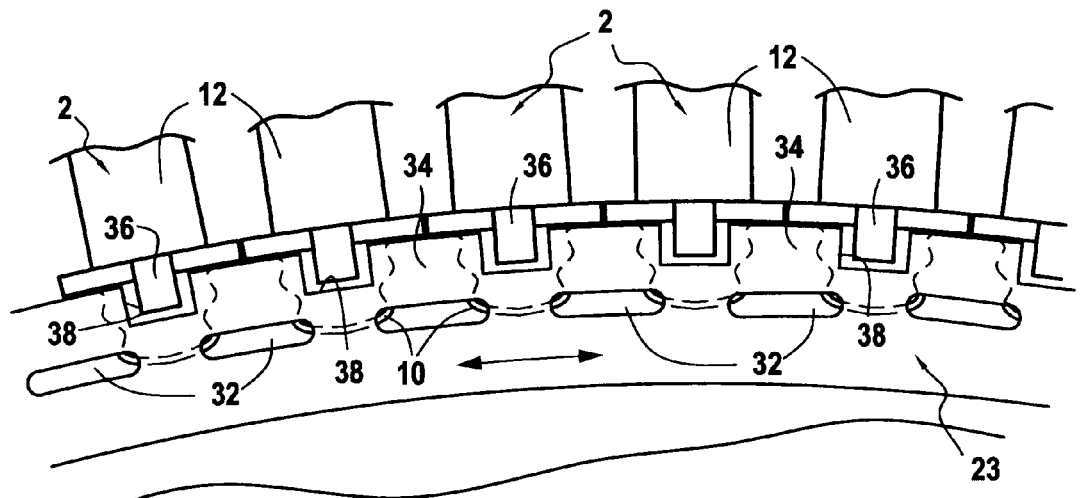
FIGS. 3A and 3B are rear views of the FIG. 1 device showing how it is put into place.
Figure 3B:
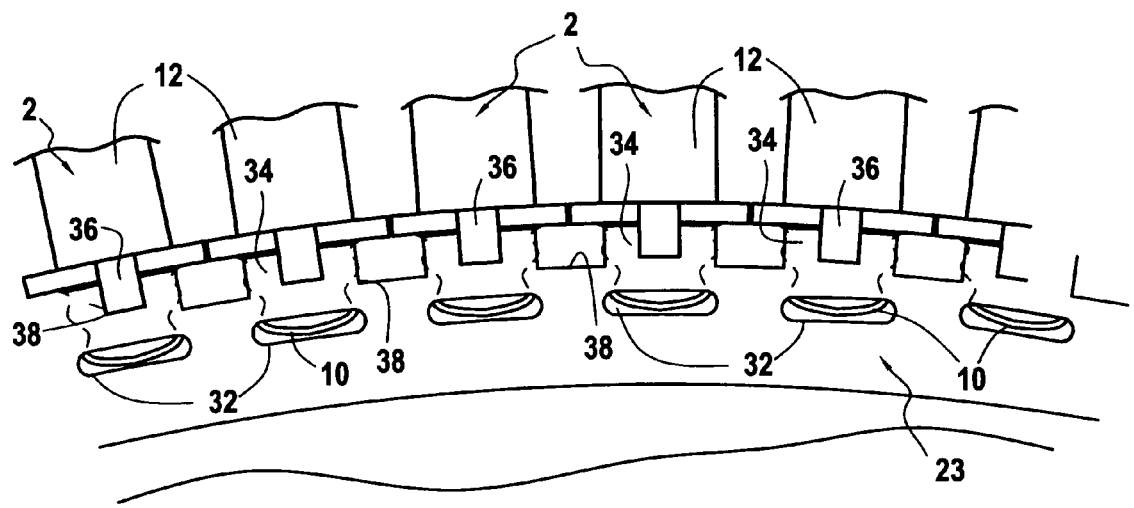

As shown in FIGS. 3A and 3B, each of these teeth 34 is designed to co-operate axially with a corresponding tooth (or nib) 36 of a root 12 of a rotor blade 2 of the turbine. Furthermore, the teeth 34 of the retaining annulus define between them a plurality of notches 38 that are dimensioned to allow the teeth 36 of the blade roots to pass between them.

The presence of the teeth 34 on the retaining annulus 22 thus serves to hold the blades axially. Furthermore, air also feeds the slots 10 in the disk via their upstream ends by passing between two adjacent teeth 34, i.e. through the notches 38. The cooling of the slots in the disk is thus reinforced.

FIGS. 3A and 3B show how the retaining annulus 22 is mounted against the upstream radial face of the disk. In FIG. 3A, the annulus is brought against this upstream radial face while aligning the notches 38 of the downstream end 23 of the disk axially with the teeth 36 of the blade roots. The retaining annulus is then turned about the longitudinal axis of the turbomachine until its teeth 34 come axially into contact with the corresponding teeth 36 of the blade roots, as shown in FIG. 3B, thereby axially retaining the blades in the slots of the disk. The bolted connections 26 between the upstream ends of the respective flanges of the retaining annulus and of the disk are then tightened to ensure that the retaining annulus is fastened securely and prevented from turning.

What is claimed is:

1. A device for cooling the slots in a turbomachine rotor disk, the device comprising:
   a rotor disk comprising:
      at its periphery, a plurality of substantially axial slots that are regularly distributed around the axis of rotation of the disk; and
      an annular flange extending upstream from an upstream radial face of the disk;
   a plurality of blades each having a root mounted in a corresponding slot in the rotor disk;
   a retaining annulus having an end that is mounted against the upstream radial face of the disk and an annular flange that extends upstream from said upstream radial face of the disk and that is placed around the flange of the disk, while co-operating therewith to leave an annular space forming a cooling air diffusion cavity, this diffusion cavity opening out at its downstream end into the bottom of each of the disk slots, at the upstream ends thereof; and a plurality of air admission orifices regularly distributed around the axis of rotation of the disk and opening out into the diffusion cavity at the upstream end thereof;

wherein the end of the retaining annulus that is mounted against the upstream radial face of the disk includes a plurality of openings distributed around the axis of rotation of the disk and opening out axially into the bottom of each of the slots in the disk, at the upstream ends thereof.

2. A device according to claim 1, in which the end of the retaining annulus that is mounted against the upstream radial face of the disk further includes a plurality of teeth extending radially outwards, each of which is designed to co-operate axially with a corresponding tooth of a blade root in order to retain said blades axially.

3. A turbomachine, including at least one device for cooling slots in a rotor disk, and in accordance with claim 1.

* * * * *